Oct. 8, 1957 H. J. LANDRETH 2,809,044
LATHE WORK CENTER
Filed April 30, 1957
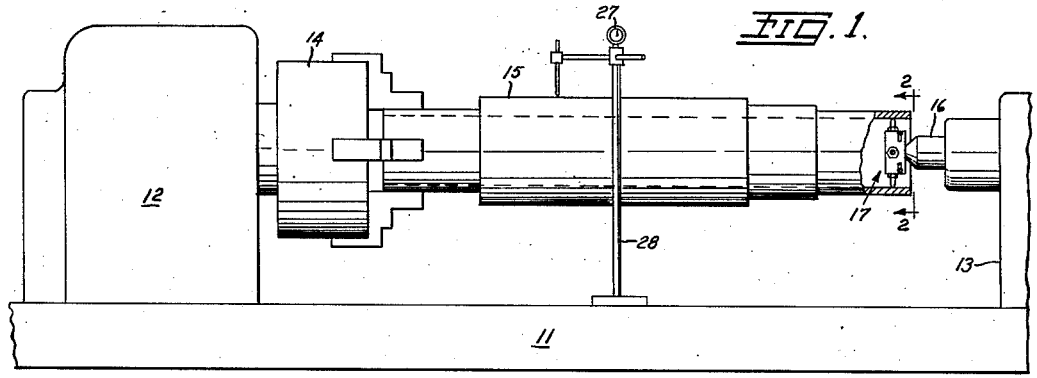
FIG. 1.
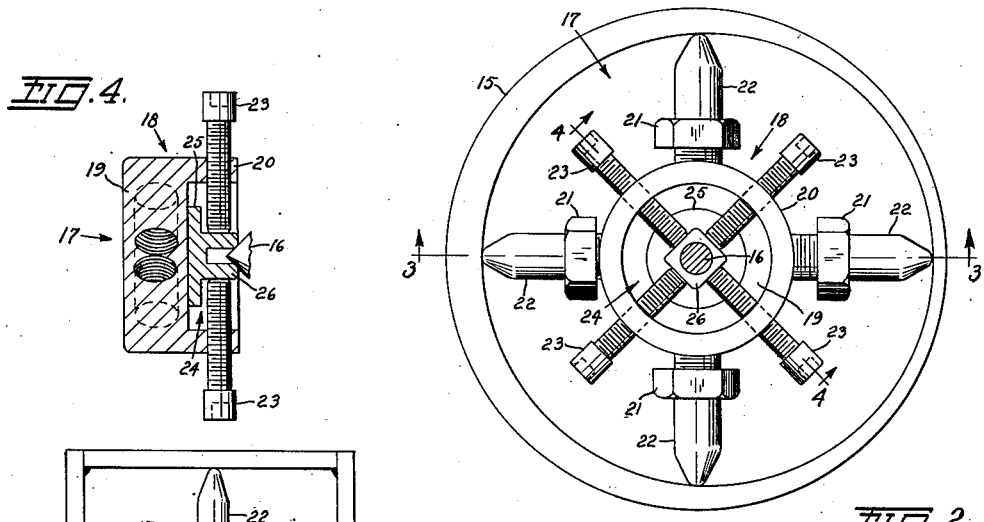
FIG. 4.
FIG. 2.
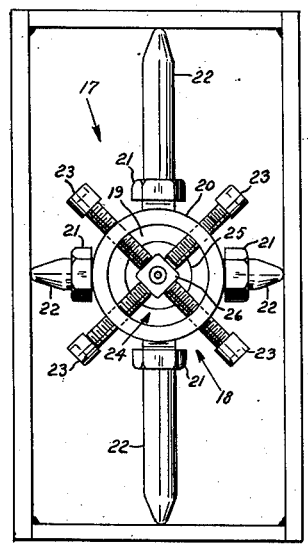
FIG. 5.
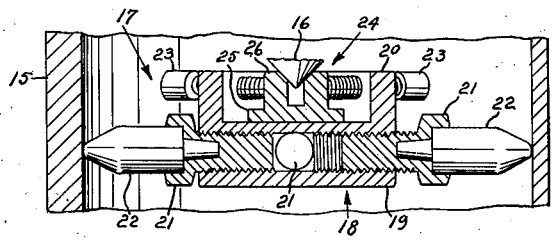
FIG. 3.
INVENTOR
Herschel J. Landreth
BY
AGENT

United States Patent Office 2,809,044
Patented Oct. 8, 1957

2,809,044

LATHE WORK CENTER

Herschel J. Landreth, Portland, Oreg.

Application April 30, 1957, Serial No. 655,993

2 Claims. (Cl. 279—2)

This invention relates generally to machine tools of the type which rotate the piece being worked against a cutting tool and more particularly to tools and fixtures for setting the work piece into the part of the machine which will rotate the work piece.

As here disclosed in the practice of my invention the machine tool is an engine lathe, the work piece is a tubular form held at one end by a four jaw chuck in the head stock of the lathe and supported at the other end through the lathe work center of this invention by the tail stock of the lathe with which either a live or dead center may be used.

It is the principal object of this invention to provide for the tail stock end of a hollow work piece to be worked in an engine lathe a laterally positionable center which can secure the work piece at a desired tail stock center position when the desired center position has been found.

It is a second object to provide such a variable centering device which can be used quickly to position a hollow lathe work piece at a previously established tail stock center after the workpiece has been removed from the lathe and then replaced therein.

How these and other objects are attained is explained in the following description referring to the attached drawing in which Fig. 1 is a fragmentary view in side elevation of an engine lathe and a hollow workpiece held therein at its tail stock end by the lathe work center of this invention.

Fig. 2 is an end elevation in partial section along the line 2—2 of Fig. 1.

Fig. 3 is a view in plan section along the line 3—3 of Fig. 2.

Fig. 4 is a fragmental view in partial section along the line 4—4 of Fig. 2.

Fig. 5 is a view similar to Fig. 2 but including a work piece having a rectangular tail end opening into which my lathe work center is fitted.

Like numerals of reference refer to like parts in the several figures of the drawing.

Referring now to the drawing, in Fig. 1 is shown fragmentally an engine lathe having a bed 11 on which are secured a head stock 12 and a tail stock 13. Head stock 12 may be assumed to include a driving motor and transmission gearing, not shown, for driving at a desired speed of rotation four jaw chuck 14 holding work piece 15 at one end. Tail stock 13 is movable towards and away from headstock 12 and tail stock 13 is equipped with a tail stock center 16 axially aligned with the center of rotation of head stock 14. Tail stock center 16 is axially positionable in tail stock 13.

In the drawing it is seen that tail stock center 16 is too small in diameter itself to engage the interior wall of work piece 15 to support the work while it is being worked in the lathe. Up to reasonable diameters it has been the previous practice to supply for center 16 a conical end attachment large enough to engage the work piece. Or the end of the work piece could be plugged and a center hole could be established in the plug.

To plug the work piece end and determine a center in the plug takes time and is therefore wasteful. Also if the work piece is taken from the lathe and the plug removed it is a tedious job to replace the work properly in the lathe if further work must be done on it. It will now be seen that my lathe work center, indicated generally as 17, provides an easy and accurate method of centering the work piece at the tail stock end.

Body 18 of work center 17 is formed with a relatively thick base 19 from the rim of which a cylindrical collar 20 extends coaxially therefrom. Diametrically through base 19 and perpendicular one to the other in a plane normal to the axis of body 18 are formed a pair of threaded holes into the ends of which, as shown, four positioning screws 21 are threaded. Screws 21 are formed with hexagonal heads into each of which an outwardly diverging tapered socket is sunk to receive one of the work engaging pins 22. As shown, pins 22 are formed with tapered ends having rounded points properly to engage the work piece and pins 22 are made of various length to be used as required. Pins 22 are secured against the interior wall of the work piece with the aid of a wrench applied to the hexagonal heads of screws 21 as required.

Collar 20 of body 18 is formed in a plane normal to its axis with four equally spaced radial holes to receive the four screws 23 headed as indicated to be engaged by an Allen set screw wrench.

Adjustably positionable over the interior bottom surface of body 18 is work center cup 24 formed with a disk like base 25 and a square center boss 26 extending axially therefrom. Axially into the free end of boss 26 a centering depression is formed to receive the end of tail stock center 16, as shown. Screws 23 confine base disk 25 of cup 24 in position against base 19 within collar 20 of body 18. Screws 23 also, by pressing against the four opposed flat lateral surfaces of boss 26, position center cup 24 in alignment with the conical point of tail stock center 16.

The use of my lathe work center 17 is as follows. Having a work piece requiring a lathe operation for forming on the piece a surface of rotation concentric with the lathe axis or a flat surface perpendicular to the lathe axis, the piece to be worked is first supported at one end on the rotating head of the lathe either by a chuck 14 as shown or by other well known means. The piece is next adjusted on the head stock so that its proposed axis of rotation is approximately the lathe axis and my work center 17 is inserted in the hollow tail end of the work piece. The lathe tail stock 13 is then advanced towards the work and the conical end of tail stock center 16 advanced towards work center 17. If by adjusting screws 23 center cup 24 can be moved so that the centering depression formed in the end of boss 26 of cup 24 will be aligned with the point of tail stock center 16, center 16 is engaged loosely with cup 24 at its center. See Fig. 1. If cup 24 and center 16 cannot be so engaged, body 18 is recentered by adjusting screws 21 as a fine adjustment or by changing pins 22 to others of different length until the coarse adjustment positioning of body 18 is within the fine adjustment range of screws 21. Screws 21 are then set up tightly to secure body 18 into the work piece, like 15, Figs. 1 and 2.

Now with screws 23 loosely holding center cup 24 as positioned by engagement with tail stock center 16, the workpiece is given its final centering adjustment by any of the many gaging means, like dial gage 27 and gage stand 28, well known to lathe operators. When the work piece is centered as desired, tail stock center 16 is moved firmly into the center depression of cup 24 to hold cup 24 on center while screws 23 are set up tight to fix the center of cup 24 which now becomes the tail center of work piece, like 15.

Fig. 5 is for the purpose of showing how my work center 17 is adaptable to other than a circular opening.

Also it should be noted that it would not depart from the teaching of my invention to make my work center with different numbers of screws 21 or 23 than the four shown in each case. In some cases it might be desirable to make body 18 with more holes around base 19 to receive screws 21 so that the positions of screws 21 could conform to irregularities found in the tail end hole in the work piece.

Having recited some of the objects of my invention, illustrated and described a preferred way in which my invention may be practiced and explained its use, I claim:

1. A lathe work center for finding and maintaining a tail end center for a lathe work piece having a large tail end opening, said work center comprising a body formed with a relatively thick disklike base and a cylindrical collar extending axially in one direction from said base, a work center cup formed with a disklike base smaller in diameter than the interior of said cylindrical collar and a multiple flat sided boss formed centrally on one side of said base of said cup to extend axially towards the open end of said collar when the other side of said base of said cup rests against the inside base surface of said body, said base section of said body being formed with a plurality of radial holes circumferentially spaced thereabout radially adjustably to receive respectively a plurality of headed first screws, the heads of each of said first screws being formed with depressions therein to receive interchangeable pins of various lengths for extending said first screws, and said collar section of said body being formed with multiple circumferentially spaced radial threaded holes therethrough to receive respectively a multiple of screws equal in number to the flat sides of said multiple flat sided boss for confining said boss and said center cup in a desired radial and angular position with respect to said body.

2. A lathe work center for finding and maintaining a tail end center for a lathe work piece having an irregular off center tail end opening, said work center comprising a work center body, a plurality of means radially outwardly extensible with respect to said body for cooperating with said body and the walls of said tail end opening in said work piece to position said base within said opening transversely of the center line of said lathe, a work center cup including means for holding said cup on said body for transverse movement therealong, said cup including multiple radial abutment faces circumferentially spaced about said cup formed thereon, said body including multiple means radially inwardly extensible with respect to said body for cooperating with said body and the respective multiple radial abutment faces of said cup to position said cup within said body transversely of the center line of said body and said cup including an axial depression formed therein to receive a lathe tail stock center point.

References Cited in the file of this patent
UNITED STATES PATENTS 1,428,620    Wilber _____ Sept. 12, 1922

FOREIGN PATENTS 22,543    Great Britain _____ Nov. 30, 1911